(12) United States Patent
Lee et al.

(10) Patent No.: US 6,335,056 B1
(45) Date of Patent: Jan. 1, 2002

(54) TRANSPARENT CONDUCTIVE COMPOSITION, TRANSPARENT CONDUCTIVE LAYER FORMED OF THE SAME, AND MANUFACTURING METHOD THEREOF

(75) Inventors: Jong-hyuk Lee, Seoul; Yoon-ho Jun, Suwon; Yoon-hyung Cho, Seoul; Jong-hwan Park, Suwon; Dong-sik Zang, Koyang, all of (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 0 days.

(21) Appl. No.: 09/362,739

(22) Filed: Jul. 29, 1999

Related U.S. Application Data

(62) Division of application No. 08/987,323, filed on Dec. 9, 1997.

(30) Foreign Application Priority Data

Dec. 10, 1996 (KR) .............................. 96/64007

(51) Int. Cl.⁷ ................................. B05D 3/02
(52) U.S. Cl. .................... 427/372.2; 427/379; 427/380
(58) Field of Search .............................. 427/372.2, 379, 427/380; 252/299.01, 512, 513, 514, 518.1, 519.2, 520.1, 520.2, 520.3; 428/433, 434, 699, 701, 328

(56) References Cited

U.S. PATENT DOCUMENTS

| | | | |
|---|---|---|---|
| 4,945,282 A | 7/1990 | Kawamura et al. | 313/479 |
| 5,013,607 A | 5/1991 | Sato et al. | 428/426 |
| 5,376,308 A | 12/1994 | Hirai et al. | 252/518 |
| 5,384,356 A | 1/1995 | Nogami et al. | 524/726 |
| 5,424,008 A | 6/1995 | Hirai et al. | 252/501.1 |
| 5,700,391 A | 12/1997 | Nogami et al. | 252/299.01 |
| 5,817,255 A | 10/1998 | Tanaka et al. | 252/582 |

*Primary Examiner*—Deborah Jones
*Assistant Examiner*—Stephen Stein
(74) *Attorney, Agent, or Firm*—Lowe Hauptman Gilman & Berner, LLP

(57) ABSTRACT

A transparent conductive composition, a transparent conductive layer formed of the composition and a manufacturing method thereof are provided The composition contains a transparent conductive particle, metal alkoxide [$M_1(OR)_4$]; metal ($M_2$) particles or salt thereof ($M_2X$) and a catalyst. Here, the metal alkoxide [$M_1(OR)_4$] is one selected from the group consisting of $Si(OR)_4$, $Ti(OR)_4$, $Sn(OR)_4$ and $Zr(OR)_4$, where R is $C_1$–$C_4$ alkyl, and the metal ($M_2$) is at least one selected from the group consisting of silver (Ag), gold (Au), platinum (Pt), copper (Cu), nickel (Ni), lead (Pb), cobalt (Co), rhodium (Rh), ruthenium (Ru) and tin (Sn), and X is one selected from the group consisting of chloride, nitrate and sulfonate. Therefore, a transparent conductive layer having improved conductivity, transmittance and hardness can be obtained through a low-temperature sintering process.

11 Claims, 1 Drawing Sheet

TRANSPARENT CONDUCTIVE COMPOSITION, TRANSPARENT CONDUCTIVE LAYER FORMED OF THE SAME, AND MANUFACTURING METHOD THEREOF

This application is a Divisional of application Ser. No. 08/987,323 filed Dec. 9, 1997.

BACKGROUND OF THE INVENTION

The present invention relates to a transparent conductive composition, a transparent conductive layer formed of the same and a manufacturing method thereof, and more particularly, to a composition for a transparent conductive layer used as an anti-static layer and an electromagnetic wave shielding layer of home appliances, and a power supplying transparent electrolyte of a flat panel display, a transparent conductive layer formed of the composition and a manufacturing method thereof.

A transparent conductive layer is a thin layer formed on the surface of an insulation material layer having high light transmittance. The transparent conductive layer includes a metal thin film of platinum (Pt) or gold (Au) and a metal oxide thin film of indium tin oxide (ITO), tin oxide, titanium oxide or antimony oxide.

Generally, the transparent conductive layer is manufactured by a sputtering method, a deposition method or an ion beam method. When intending to form the transparent conductive layer by one of the above methods, a high-price equipment such as vacuum device is required, increasing the manufacturing costs. Also, since the manufacturing process by the above method is performed under a vacuum condition, the size of a thin film to be manufactured is severely limited.

To solve the above problems, a method for manufacturing a transparent conductive layer has been suggested, which includes the steps of coating a dispersion containing transparent conductive particles on a substrate to form a conductive layer, and then forming a protective layer made of a hydrolyzed product of a metal alkoxide on the resultant structure. The structure of the transparent conductive layer formed by the above method is shown in FIG. 1.

Referring to FIG. 1, transparent conductive particles 14 of the conductive layer 12 formed on a substrate 11 do not directly contact each other and void is existed in space between the transparent conductive particles 14. Here, reference numeral 13 represents the protective layer made of a hydrolyzed product of a metal alkoxide.

However, a solvent used in manufacturing the transparent conductive layer partially remains in the void. The void between the transparent conductive particles increase contact resistance of the transparent conductive layer, thereby lowering the conductivity of the layer.

In order to obtain a transparent conductive layer having excellent conductivity, it is necessary to perform a high-temperature (400° C. or more) sintering process under a reduction atmosphere. However, it is difficult to apply this method adopting the high-temperature sintering process to articles that have poor heat-resistance such as plastics, and the method may damage a coating equipment, causing difficulties in practical use.

SUMMARY OF THE INVENTION

It is an object of the present invention to provide a composition for a transparent conductive layer having excellent conductivity.

It is another object of the present invention to provide a transparent conductive layer having excellent conductivity, transmittance and hardness.

It is still another object of the present invention to provide a manufacturing method of the transparent conductive layer.

To achieve the first object, there is provided a transparent conductive composition comprising transparent conductive particles; metal alkoxide [$M_1(OR)_4$]; metal ($M_2$) particles or salt thereof ($M_2X$); and a catalyst,
wherein the metal alkoxide [$M_1(OR)_4$] is one selected from the group consisting of $Si(OR)_4$, $Ti(OR)_4$, $Sn(OR)_4$ and $Zr(OR)_4$, where R is $C_1$–$C_4$ alkyl, and the metal ($M_2$) is at least one selected from the group consisting of silver (Ag), gold (Au), platinum (Pt), copper (Cu), nickel (Ni), lead (Pb), cobalt (Co), rhodium (Rh), ruthenium (Ru) and tin (Sn), and X is one selected from the group consisting of chloride, nitrate and sulfonate.

To achieve the second object, there is provided a transparent conductive layer comprisng transparent conductive particles, a hydrolyzed product of metal alkoxide [$M_1(OR)_4$] and metal ($M_2$) particles, wherein the metal alkoxide [$M_1(OR)_4$] is one selected from the group consisting of $Si(OR)_4$, $Ti(OR)_4$, $Sn(OR)_4$ and $Zr(OR)_4$, where R is $C_1$–$C_4$ alkyl, and the metal ($M_2$) is at least one selected from the group consisting of silver (Ag), gold (Au), platinum (Pt), copper (Cu), nickel (Ni), lead (Pb), cobalt (Co), rhodium (Rh), ruthenium (Ru) and tin (Sn).

To achieve the third object, there is provided a method for manufacturing a transparent conductive layer comprising the steps of:

(a) coating a first composition containing a transparent conductive particle on a substrate; and (b) coating a second composition containing a metal alkoxide [$M_1(OR)_4$]; metal ($M_2$) particles or salt thereof ($M_2X$); and a catalyst on the resultant, and drying and heating the resultant, wherein the metal alkoxide [$M_1(OR)_4$] is one selected from the group consisting of $Si(OR)_4$, $Ti(OR)_4$, $Sn(OR)_4$ and $Zr(OR)_4$, where R is $C_1$–$C_4$ alkyl, and the metal ($M_2$) is at least one selected from the group consisting of silver (Ag), gold (Au), platinum (Pt), copper (Cu), nickel (Ni), lead (Pb), cobalt (Co), rhodium (Rh), ruthenium (Ru) and tin (Sn), and X is one selected from the group consisting of chloride, nitrate and sulfonate.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
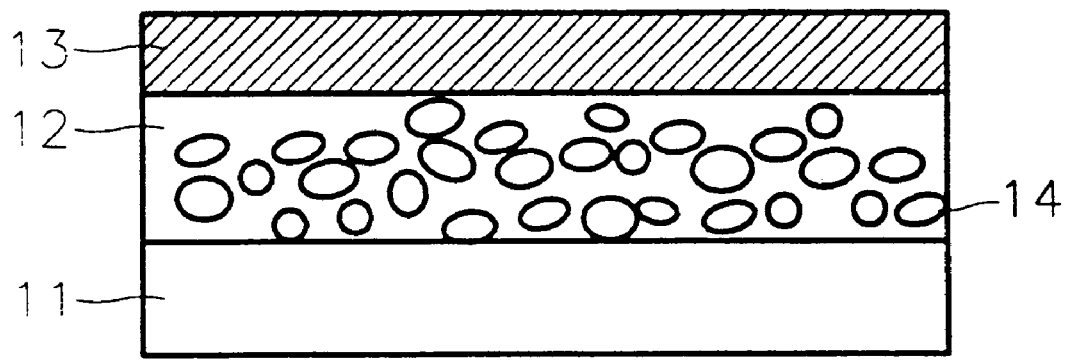
FIG. 1 is a diagram showing the structure of a transparent conductive layer formed by a conventional method.

According to the present invention, in order to make a hydrolysis reaction of metal salt ($M_2X$) (reaction formula (1)) irreversible, a sol-gel reaction of a metal alkoxide [$M_1(OR)_4$] such as silicon alkoxide is used. As a result, a metal ion ($M_2$) is contained in a network structure of the silicate as shown in the following reaction formula (2).

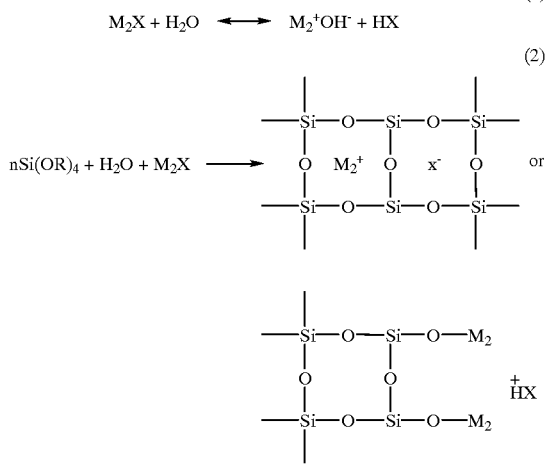

$$M_2X + H_2O \rightleftharpoons M_2^+OH^- + HX \quad (1)$$

$$nSi(OR)_4 + H_2O + M_2X \longrightarrow \begin{array}{c} \text{(structure with Si-O-Si network containing } M_2^+ \text{ and } X^-\text{)} \end{array} \text{ or } \quad (2)$$

where $M_2$ represents a metal ion and X is chloride, nitrate or sulfonate.

Also, a transparent conductive composition of the present invention may further include a reducing agent capable of reducing a metal salt ($M_2X$) in the reaction of the formula (2). When adding the reducing agent to the composition, the reactivity of the reaction represented by the formula (2) can be increased.

As the reducing agent, $NaBH_4$, $SnCl_2$, glycols or ketones is used. Preferably, the content of the reducing agent is $1 \times 10^{-4}$–$8 \times 10^{-2}$ mol % based on the 1 mole of the metal alkoxide. When the reducing agent content is within the above range, the reactivity of the reaction represented by the formula (2) is the highest.

The metal ($M_2$) particle of the present invention is at least selected from the group consisting of silver (Ag), gold (Au), platinum (Pt), copper (Cu), nickel (Ni), lead (Pb), cobalt (Co), rhodium (Rh), ruthenium (Ru) and tin (Sn). Particularly, Ag, Au and Pt, which are very resistant to oxidation are preferably used. Here, it is preferable that the metal ($M_2$) particle is 5–90 nm in diameter. If the diameter of the metal particle is less than 5 nm, conductivity of the transparent conductive layer is not sufficient. If the diameter of the metal particle exceeds 90 nm, transmittance thereof is decreased.

As the metal salt ($M_2X$) of the present invention, materials that are soluble in water, alcohol or ketone may be used. Particularly, chloride, nitrate or sulfonate which includes metal ($M_2$) is preferably used.

Preferably, the molar ratio of the metal ($M_2$) of the metal salt ($M_2X$) to the metal ($M_1$) of the metal alkoxide [$M_1(OR)_4$] is 0.01:1–0.2:1. If the molar ratio of the metal $M_2$ to metal $M_1$ is less than 0.01/1, the improved effect on the conductivity of the transparent conductive layer is minimal. On the other hand, if the molar ratio exceeds 0.2/1, the transmittance thereof sharply decreases, providing difficulties in practical use.

The catalyst of the present invention facilitates the hydrolysis of the metal alkoxide and includes an acid such as hydrochloric acid or nitric acid. Here, the catalyst content is 0.01–0.04 mole % based on 1 mole of the metal alkoxide.

There is no restriction on the solvent of the present invention. However, generally, an alcoholic solvent, e.g., methanol, ethanol and n-butanol, pure water or a mixture thereof is used.

As the transparent conductive particle of the present invention, any transparent conductive particle may be used, e.g., metal oxide such as indium tin oxide (ITO), tin oxide, indium oxide, titanium oxide or antimony titanium oxide (ATO).

Hereinafter, a method for manufacturing a transparent conductive layer using the transparent conductive composition according to the present invention will be described in detail.

First, transparent conductive particles having a diameter of 5–120 nm are dispersed in solvents to prepare a first composition. Then, the composition is coated on a substrate, and the resultant is dried. Here, the drying step may be omitted.

Metal alkoxide [$M_1(OR)_4$], metal salt ($M_2X$), pure water and alcoholic solvent are mixed and then nitric acid or hydrochloric acid is added to the mixture to prepare a second composition. Here, the metal alkoxide [$M_1(OR)_4$] is selected from the group consisting of $Si(OR)_4$, $Ti(OR)_4$, $Sn(OR)_4$ and $Zr(OR)_4$, wherein R is $C_1$–$C_4$ alkyl.

Figure 2:
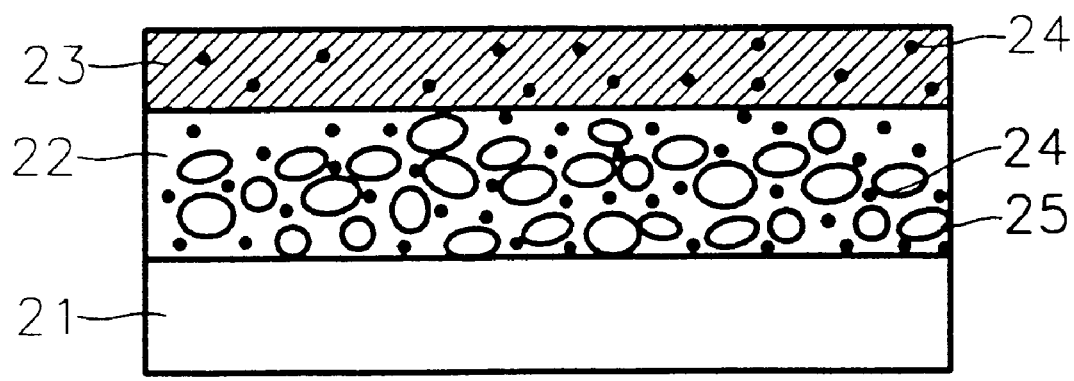
FIG. 2 is a diagrams showing the structure of a transparent conductive layer according to the present invention.

The above-prepared second composition is coated on the substrate and then dried. Then, the resultant is heated at 160–300° C., preferably, 180–200° C., for 30–60 minutes to obtain a transparent conductive layer as shown in FIG. 2. Here, reference numeral 21 represents a substrate, reference numeral 22 represents a conductive layer, reference numeral 23 represents a hydrolyzed product of metal alkoxide, reference numeral 24 represents metal ($M_2$) particles, reference numeral 25 represents transparent conductive particles, respectively. As shown in FIG. 2, the metal ($M_2$) particles 25 exist in the void between the transparent conductive particles 22. Accordingly, the obtained transparent conductive thin layer has excellent conductivity.

Hereinafter, examples of the present invention will be described in detail, however, the present invention is not limited to the following examples.

Example 1

2.5 g of tin-doped indium oxide particle having a diameter of about 80 nm was dispersed in a mixed solvent including 20 g of methanol, 67.5 g of ethanol and log of n-butanol to prepare a first composition.

4.5 g of tetraethyl orthosilicate was added to a mixed solvent including 30 g of methanol, 50 g of ethanol, 12 g of n-butanol and 4 g of pure water, and then 0.6 g of nitric acid ($HNO_3$) and 0.3 g of silver nitrate ($AgNO_3$) were added to the mixture. The resultant was stirred for about 24 hours at room temperature to prepare a second composition.

While rotating a cleaned glass substrate at about 90 rpm, 50 cc of the first composition was poured on the glass substrate and then the rotation speed of the glass substrate was increased to about 150 rpm. Then, 60 cc of the second composition was coatted on the resultant in the same manner as the first composition. Then, the substrate on which the first and second compositions had been coated sequentially was dried, and then sintered at 200° C. for 1 hour to complete a transparent conductive layer.

Example 2

A transparent conductive layer was manufactured by the same method as Example 1, except that 0.001 g of $NaBH_4$ as a reducing agent was further added to the second composition.

Example 3

A transparent conductive layer was manufactured by the same method as Example 1, except that the first composition was prepared as follows.

4.5 g of tetraethyl orthosilicate was added to a mixed solvent including 30 g of methanol, 50 g of ethanol, 12 g of n-butanol and 4 g of pure water, and then 0.6 g of nitric acid and 0.2 g of chlorocauric acid ($HAuCl_4 \cdot 4H_2O$) were added to the mixture. Then, the obtained mixture was stirred for about 30 hours at room temperature to prepare a first composition.

Example 4

A transparent conductive layer was manufactured by the same method as Example 1, except that the second composition was prepared as follow.

4.5 g of tetraethyl orthosilicate was added to a mixed solvent including 30 g of methanol, 50 g of ethanol, 12 g of n-butanol and 4 g of pure water, and then 0.6 g of nitric acid, 0.2 g of chlorocauric acid ($HAuCl_4 \cdot 4H_2O$) and 0.3 g of tin chloride ($SnCl_2 \cdot 2H_2O$) were added to the mixture. Then, the obtained mixture was stirred for about 30 hours at room temperature to prepare a second composition.

Comparative Example 1

A transparent conductive layer was manufactured by the same method as Example 1, except that 0.036 g of silver nitrate ($AgNO_3$) was added to the second composition.

Comparative Example 2

A transparent conductive layer was manufactured by the same method as Example 1, except that 0.73 g of silver nitrate ($AgNO_3$) was added to the second composition.

Comparative Example 3

A transparent conductive layer was manufactured by the same method as Example 1, except that silver nitrate ($AgNO_3$) was not added to the second composition.

Comparative Example 4

A transparent conductive layer was manufactured by the same method as Example 1, except that only the second composition was coated on the glass substrate.

The surface resistance, transmittance and pencil hardness of the transparent conductive layers of Examples 1–4 and Comparative Examples 1–4 were measured, and the results are shown in Table 1.

TABLE 1

| transparent conductive layer | surface resistance ($\Omega/\square$) | transmittance (%) | pencil hardness (H) |
|---|---|---|---|
| Example 1 | $7.5 \times 10^3$ | 98 | 8 |
| Example 2 | $5.0 \times 10^3$ | 98 | 8 |
| Example 3 | $4.3 \times 10^3$ | 98 | 8 |
| Example 4 | $1.1 \times 10^3$ | 98 | 8 |
| Comparative Example 1 | $1.2 \times 10^5$ | 98 | 8 |
| Comparative Example 2 | $6.0 \times 10^3$ | 87 | 5 |
| Comparative Example 3 | $1.3 \times 10^5$ | 98 | 8 |
| Comparative Example 4 | $1.2 \times 10^{12}$ | 99 | 9 |

As can be seen from Table 1, the surface resistances of the transparent conductive layers manufactured by Examples 1–4 are much lower than those of Comparative Examples 1–4, and the transmittance and pencil hardness thereof are also excellent compared to Comparative Examples 1–4.

On the other hand, in the case of the transparent conductive layer of Comparative Example 1, the transmittance and pencil hardness of the layer are excellent while the effect in the improvement of the conductivity is slight. Also, the conductivity of the transparent conductive layer of Comparative Example 2 is excellent while the transmittance and hardness thereof are poor. Also, in the cases of Comparative Examples 3 and 4 in which silver nitrate is not added, the transmittance and pencil hardness of the transparent conductive layer are excellent while the surface resistance is very poor.

The present invention provides the following effects. First, conductivity, transmittance and hardness of the transparent conductive layer are improved compared with the transparent conductive layer according to the prior art. Second, the method for manufacturing a transparent conductive layer according to the present invention does not require a high-temperature sintering process and an additional vacuum device, so that the manufacturing costs are lowered. Third, a transparent conductive layer can be manufactured by a low-temperature sintering process, so that the manufacturing method of the present invention can be applied to a substrate that does not have good heat-resistance.

What is claimed is:

1. A method for manufacturing a transparent conductive layer comprising the steps of:
    (a) coating a first composition containing a transparent conductive particle on a substrate; and
    (b) coating a second composition containing a metal alkoxide [$M_1(OR)_4$]; metal ($M_2$) particles or salt thereof ($M_2X$); and a catalyst on the resultant, and drying and heating the resultant,
    wherein the metal alkoxide [$M_1(OR)_4$] is one selected from the group consisting of $Si(OR)_4$, $Ti(OR)_4$, $Sn(OR)_4$ and $Zr(OR)_4$, where R is $C_1$–$C_4$ alkyl, and the metal ($M_2$) is at least one selected from the group consisting of silver (Ag), gold (Au), platinum (Pt), copper (Cu), nickel (Ni), lead (Pb), cobalt (Co), rhodium (Rh), ruthenium (Ru) and tin (Sn), and X is one selected from the group consisting of chloride, nitrate and sulfonate.

2. The method of claim 1, wherein the second composition further comprises a reducing agent.

3. The method of claim 2, wherein the reducing agent is one selected from the group consisting of $NaBH_4$, $SnCl_2$, glycols and ketones.

4. The method of claim 2, wherein the reducing agent content is $1 \times 10^{-4}$–$8 \times 10^{-2}$ mol % based on 1 mole of the metal alkoxide.

5. The method of claim 1, wherein the heating of the step (b) is performed at 160–300° C.

6. The method of claim 1, wherein the transparent conductive particles are 5–120 nm in diameter.

7. The method of claim 1, wherein the mole ratio of the metal ($M_2$) to the metal ($M_1$) is 0.01:1–0.2:1.

8. The method of claim 1, wherein the metal ($M_2$) particles are 5–90 nm in diameter.

9. The method of claim 1, wherein a drying process is performed before the step (b).

10. The method of claim 1, wherein the catalyst is an acid selected from the group consisting of hydrochloric acid and nitric acid.

11. The method of claim 1, wherein the catalyst content is 0.01–0.04 mol % based on the 1 mole of the metal alkoxide.

* * * * *